May 5, 1959 E. K. GARDNER 2,885,019
GUIDANCE SYSTEM ESPECIALLY ADAPTED FOR LAWN MOWER
Filed July 9, 1957 9 Sheets-Sheet 1
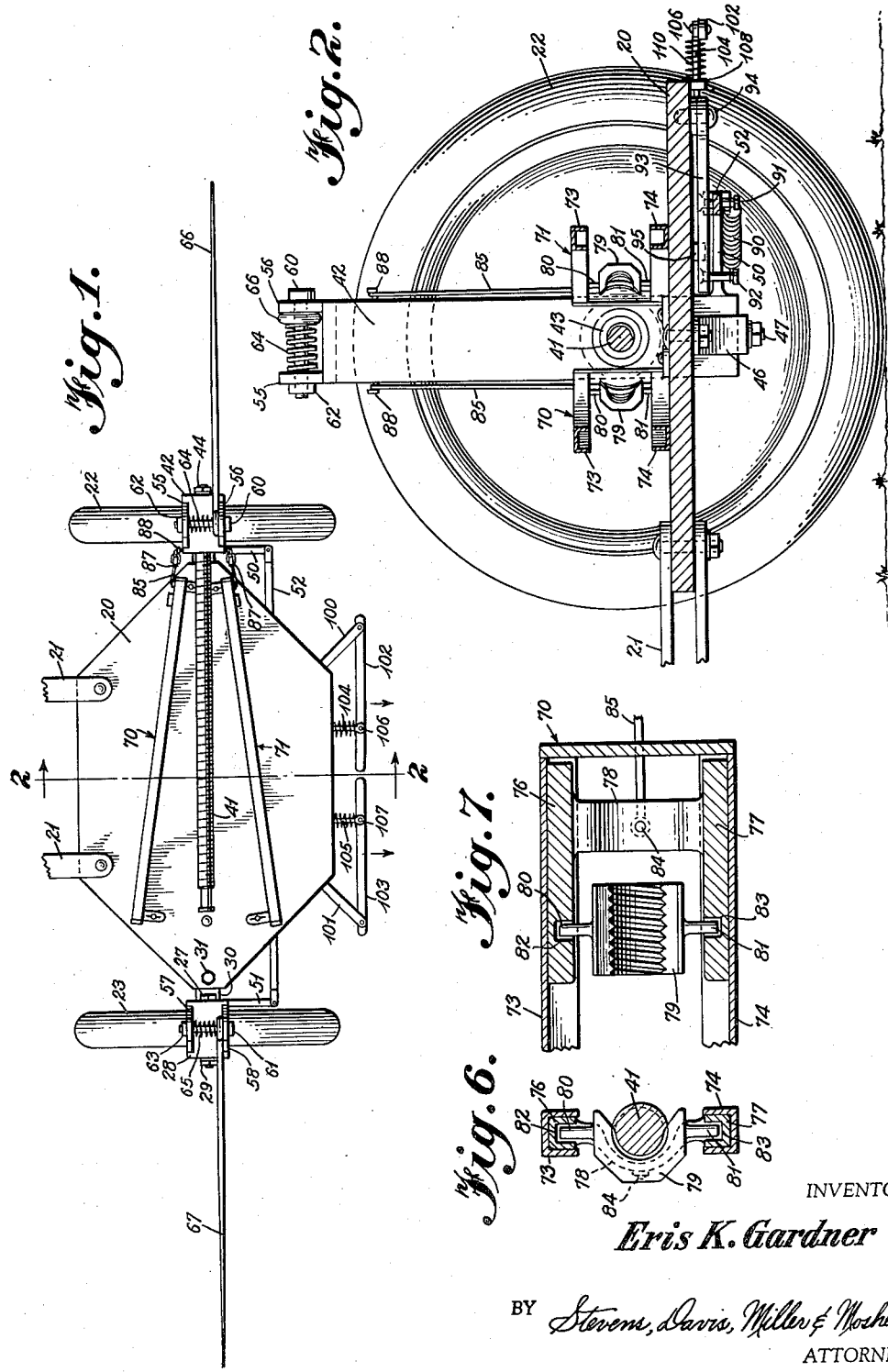
INVENTOR
*Eris K. Gardner*
BY *Stevens, Davis, Miller & Mosher*
ATTORNEYS

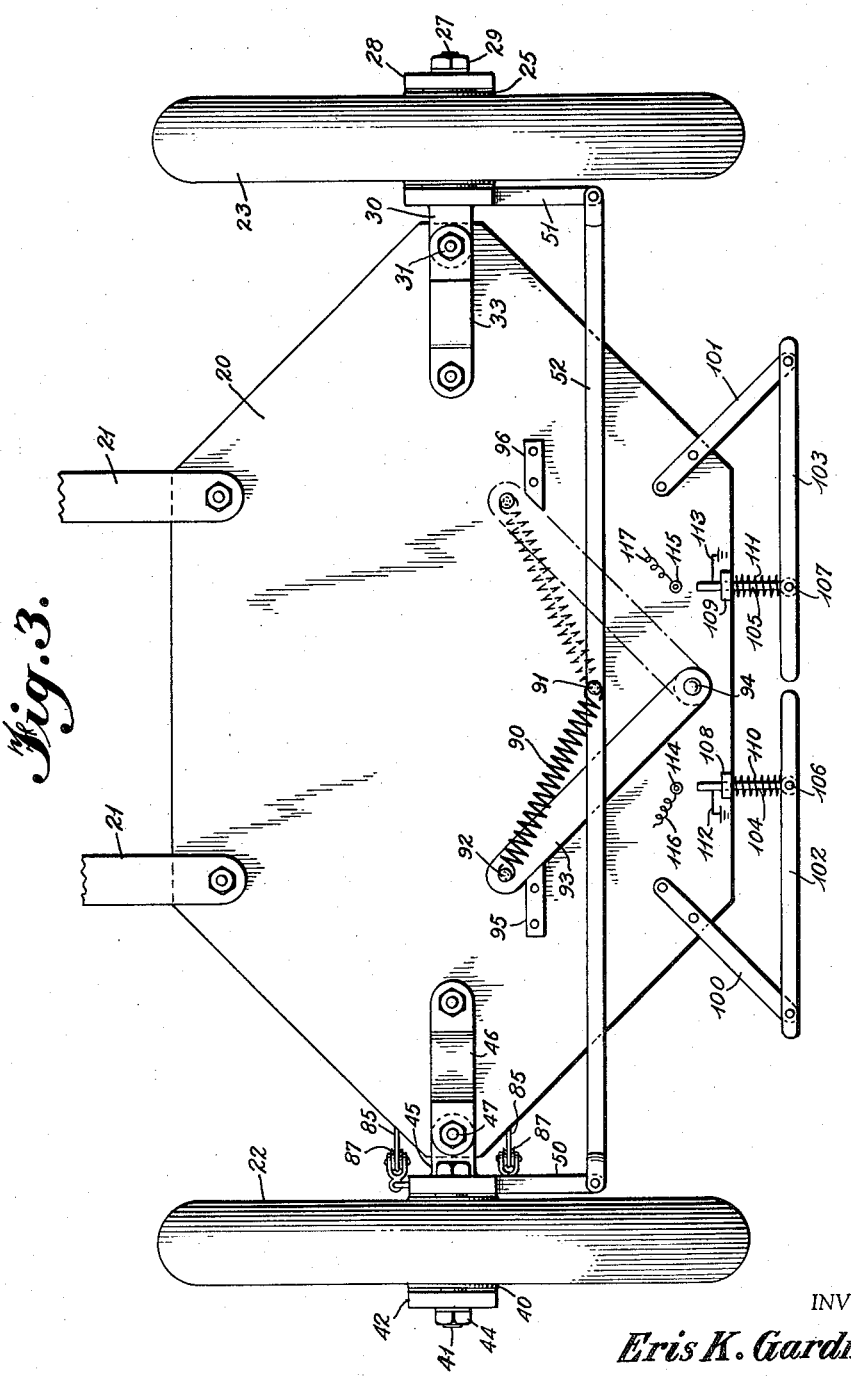

May 5, 1959  E. K. GARDNER  2,885,019
GUIDANCE SYSTEM ESPECIALLY ADAPTED FOR LAWN MOWER
Filed July 9, 1957  9 Sheets-Sheet 3

INVENTOR
Eris K. Gardner
BY Stevens, Davis, Miller & Mosher
ATTORNEYS

May 5, 1959        E. K. GARDNER        2,885,019
GUIDANCE SYSTEM ESPECIALLY ADAPTED FOR LAWN MOWER
Filed July 9, 1957        9 Sheets-Sheet 4
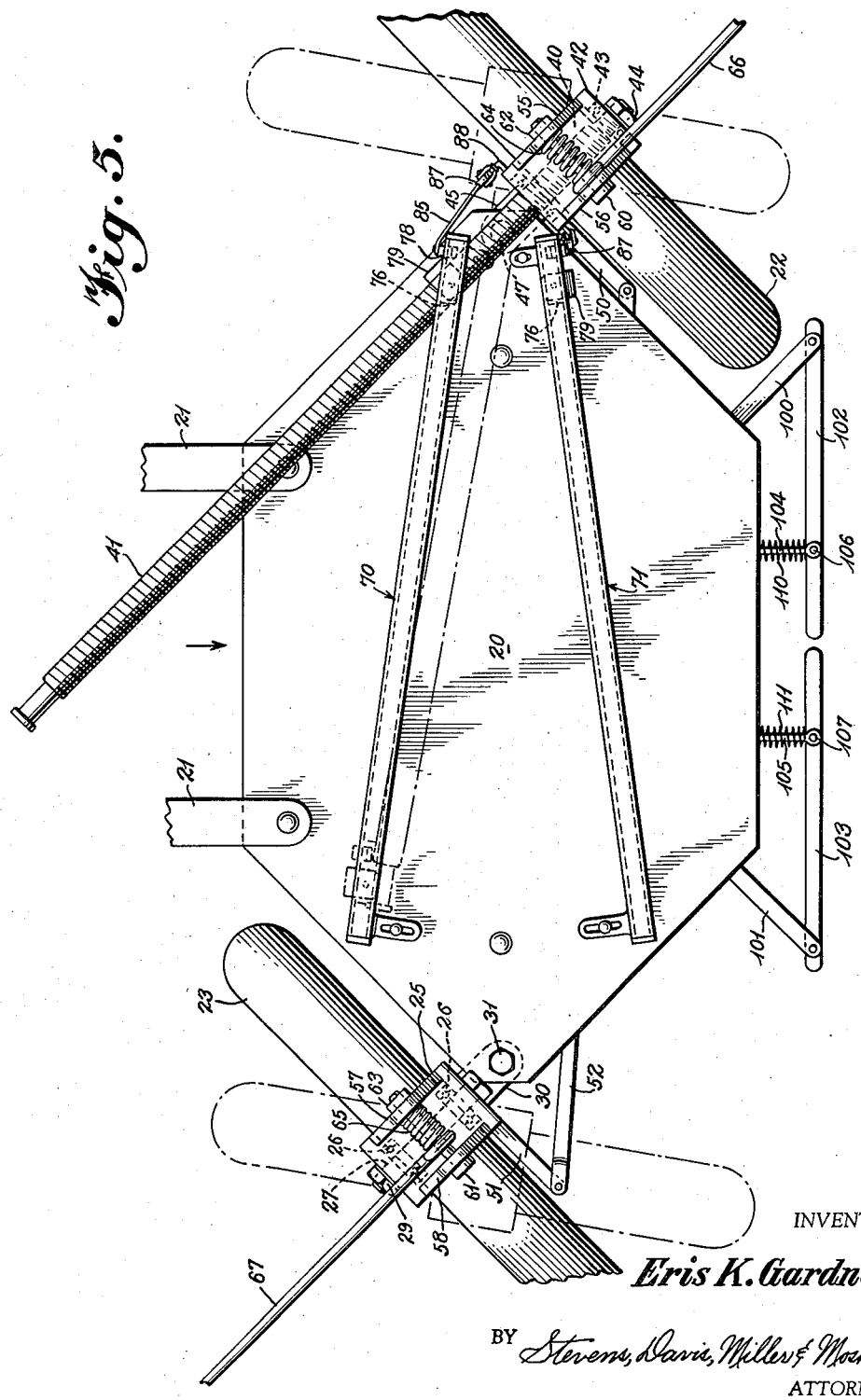
INVENTOR
*Eris K. Gardner*
BY *Stevens, Davis, Miller & Mosher*
ATTORNEYS May 5, 1959     E. K. GARDNER     2,885,019
GUIDANCE SYSTEM ESPECIALLY ADAPTED FOR LAWN MOWER
Filed July 9, 1957     9 Sheets-Sheet 5

INVENTOR
Eris K. Gardner
BY Stevens, Davis, Miller & Mosher
ATTORNEYS

May 5, 1959 E. K. GARDNER 2,885,019
GUIDANCE SYSTEM ESPECIALLY ADAPTED FOR LAWN MOWER
Filed July 9, 1957 9 Sheets-Sheet 6

INVENTOR
*Eris K. Gardner*

BY *Stevens, Davis, Miller & Mosher*
ATTORNEYS

May 5, 1959  E. K. GARDNER  2,885,019
GUIDANCE SYSTEM ESPECIALLY ADAPTED FOR LAWN MOWER
Filed July 9, 1957  9 Sheets-Sheet 7

INVENTOR
Eris K. Gardner
BY Stevens, Davis, Miller & Mosher
ATTORNEYS

May 5, 1959  E. K. GARDNER  2,885,019
GUIDANCE SYSTEM ESPECIALLY ADAPTED FOR LAWN MOWER
Filed July 9, 1957  9 Sheets-Sheet 8

INVENTOR
*Eris K. Gardner*
BY *Stevens, Davis, Miller & Mosher*
ATTORNEYS

May 5, 1959 E. K. GARDNER 2,885,019
GUIDANCE SYSTEM ESPECIALLY ADAPTED FOR LAWN MOWER
Filed July 9, 1957 9 Sheets-Sheet 9

INVENTOR
Eris K. Gardner
BY Stevens, Davis, Miller & Mosher
ATTORNEYS

United States Patent Office 2,885,019
Patented May 5, 1959

2,885,019
GUIDANCE SYSTEM ESPECIALLY ADAPTED FOR LAWN MOWER

Eris K. Gardner, Gilbert, La.

Application July 9, 1957, Serial No. 670,686

10 Claims. (Cl. 180—79)

The present invention relates to a lawn mower attachment designed to guide a lawn mower in the absence of any manual control. More particularly, the present invention relates to a guidance system for a lawn mower which relieves completely the necessity for any hand operation of the lawn mower.

The art of lawn mowers has advanced from a mechanical contrivance, pushed manually both for guidance and power, to an apparatus wherein the cutter blades are driven by an electric motor or a gas operated internal combustion engine. In certain forms of the apparatus, the motive power is coupled to one or more wheels of the apparatus, in which case no manual power is necessary to propel the apparatus but manual guidance is still needed for direction and control.

Thus far, there have only been feeble attempts at devising apparatus for use in conjunction with a lawn mower which will furnish or supply the guidance function heretofore only supplied manually. The only well known step that has been taken in this direction, concerns a simple arrangement whereby a lawn mower is caused to spiral about a post to which it is tied by a cable or rope. As the lawn mower moves, the rope wraps around the post causing the mower to spiral in ever decreasing circles.

In the case of the arrangement described in the preceding paragraph, the operation is not truly automatic since the guidance system is only of utility with respect to a prescribed small area. Once the rope attached to the lawn mower has been completely wrapped around the post, the operation is terminated so that the rope can be unwound from the post and attached to a different post. Thus, manual intervention is absolutely necessary in order to complete the cutting of any large area.

In contradistinction to the procedures outlined above, it is the principal purpose of the present invention to provide a guidance system for a lawn mower and in one embodiment, a guidance system in combination with a propelling arrangement whereby a lawn mower may be driven and guided fully automatically without the necessity for manual power for propulsion or manual control or guidance.

This is accomplished by means of the present invention by the provision of a device which can be attached to a conventional lawn mower or which may be built into a lawn mower and which consists of a unique guidance or control system for automatically guiding and controlling the movements of the lawn mower with respect to a prescribed pattern. In the event the lawn mower should strike or closely approach an obstacle, such as a tree or stake or the like, the device is provided with a reset mechanism which returns it to a starting condition and in this way the guidance function is repetitive. The arrangement is further characterized by a pattern of unique design which is characterized by a progressive movement whereby the lawn mower will advance over different areas successively.

Accordingly, it is the principal object of the present invention to provide a guidance system for a lawn mower whereby its operation will be fully automatic and will not require manual propulsion or control.

It is a further object of the present invention to provide a device of the type described which embodies a unique reset mechanism to return the device to a starting condition responsive to the presence of an obstacle in the immediate vicinity of the lawn mower.

It is a further object of the present invention to provide a novel mechanism in a device of the type described whereby a lawn mower will be caused to spiral alternately in opposite directions.

It is a further object of the present invention to provide a device of the type described which is exceedingly simple in construction and design and yet is ruggedly built for outdoor use whereby it will not fail in service.

It is a still further object of the invention to provide a device as defined for guiding a lawn mower which is further characterized by an arrangement whereby the device can be readily connected with a prime mover and serve as the propulsion wheel for the lawn mower.

Other and further objects of the invention will become more readily apparent from the following detailed description of preferred embodiments of the present invention when taken in conjunction with the appended drawings in which:

Figure 1 is a view in top plan of the device of the present invention;

Figure 2 is a view in section taken along line 2—2 of Figure 1;

Figure 3 is a view in bottom plan of the device portrayed in Figure 1;

Figure 5 is a view in top plan illustrating the guidance system;

Figure 6 is a view in section illustrating the threaded shaft and half nut assembly;

Figure 7 is a view in section further illustrating the half nut and carriage assembly;

Figure 4:
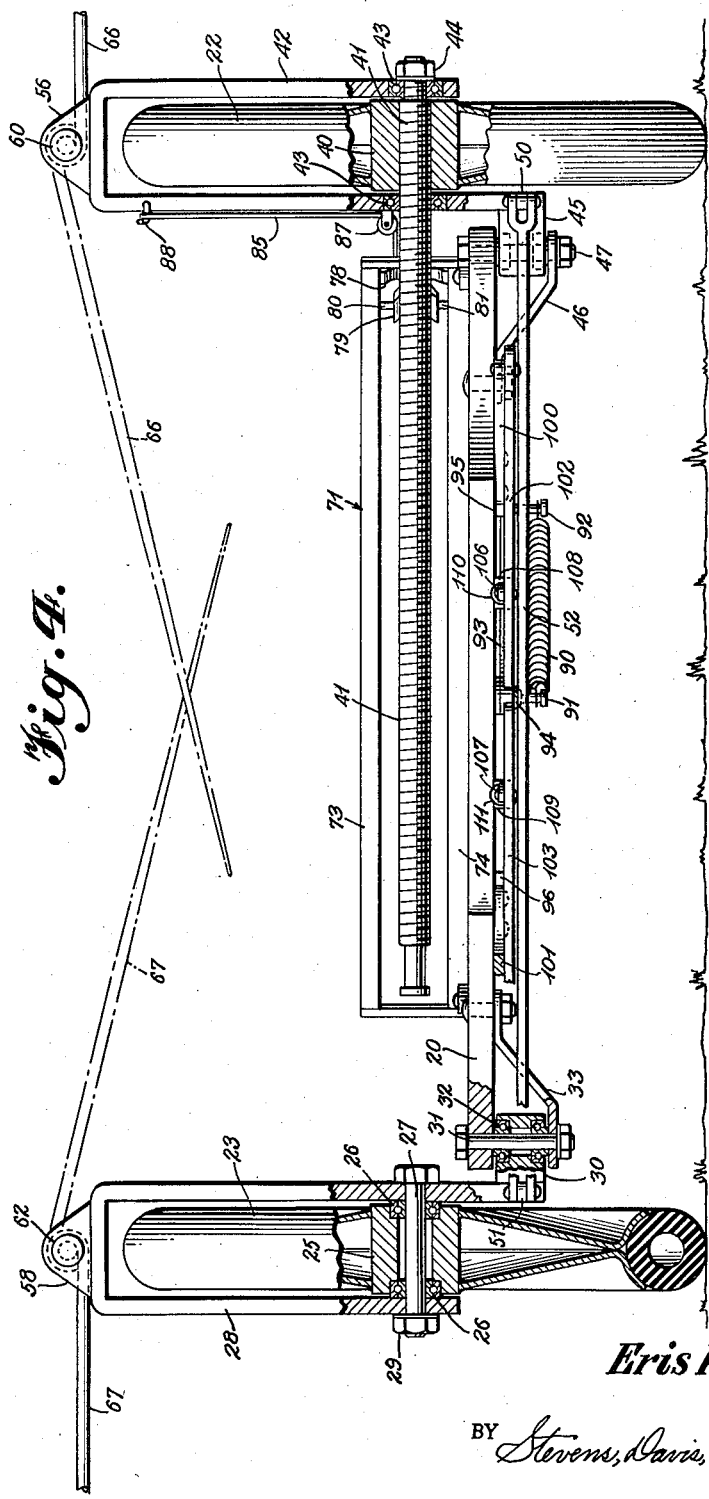
Figure 4 is a view in front elevation partly broken away.

Referring now to the drawings, and in particular Figures 1–7, a preferred embodiment of the present invention is illustrated. As will be evident, the device consists of a platform 20 provided with links 21 adapted to attach the device to the front or rear of a conventional lawn mover. It will be appreciated, however, that in place of a separate device suitable as an attachment, it is equally feasible to build the structure of the present invention directly into the lawn mower. The provision of an attachment, however, is preferred since it can be adapted for use with all types of lawn mowers. Wheels 22 and 23 are attached to opposite sides of the platform 20 in the manner illustrated in Figure 4. Wheel 23 is composed of a rim about which is received a resilient tube serving as a tire. The tube is preferably composed of rubber. Hub 25 of the rim is mounted by means of ball bearings 26 onto a short axle 27. A fork 28 passes over the wheel 23 with each leg mounted on the axle 27 and retained thereon by nuts 29. The inner leg of the fork 28 depends below the axle 27 and has attached at its extreme end, a bracket 30 which is supported on a bolt or pin 31 by means of bearings 32. A support strap or bar 33 likewise is pivotally received on the bolt 31 at one end and has its other end bolted to the platform 20.

The mounting of the wheel 22 is different from the mounting for wheel 23. Wheel 22 has its hub 40 mounted on a threaded rod 41 so that the wheel and rod 41 will turn together. The nature of wheel 22 insofar as its construction is concerned, is identical to the construction given for wheel 23. A fork 42 is received on the shaft 41 with the aid of bearings 43. A nut 44 retains the assembly together. The inner leg of the fork 42 hangs down below the shaft 41 and is connected with the platform 20 in the same way as the inner leg of fork 28, that is, a pin passes through the platform 20 and a bracket 45 bearing supported on the pin or bolt 47 is attached to the lower end of the inner leg. A strap 46 similar to strap 33 is pivotally connected to the end of the bolt 47 and bolted to the platform 20.

The ends of the inner legs of forks 42 and 28 are interconnected by a tie rod arrangement consisting of links 50 and 51, each connected to an inside leg and a tie rod 52 pivotally interconnecting with the ends of links 50 and 51. Thus, whenever one wheel turns, the other wheel will follow.

The top of the forks are provided with lugs 55, 56, 57 and 58. Bolts 60 and 61 interconnect each pair of lugs with the aid of nuts 62 and 63, respectively. Springs 64 and 65 are mounted on bolts 60 and 61, respectively, as well as feelers 66 and 67, each of which projects normally away from its respective wheel. The feelers or antennae 66 and 67 operate to determine the presence of any obstacle in the vicinity of the mower and in effect sense obstacles and are a part of the reset mechanism necessary to return the device to a starting condition.

The details of the guidance system, as well as the resetting mechanism will now be described in greater detail. The threaded rod 41 extends over the platform 20 and is slightly spaced above the platform as will be evident from Figure 4. Mounted on the platform are a pair of guides generally designated in Figure 1 as 70 and 71. The construction for the two guides is identical and accordingly, a specific description of one will suffice for a full understanding of both. Accordingly, there now follows a specific description of guide 70. The guide consists of a top U-shaped rail 73 and a bottom U-shaped rail 74 with the open portions facing each other. The rails are interconnected at their opposite ends. The assembly of the guide 70 is then bolted by means of lugs or any other suitable arrangement to the platform 20. As noted, the construction for guide 71 is identical in that it consists of identical U-shaped rails 73 and 74 interconnected at their ends. The guides are mounted on the platform 20 to form an acute angle which is bisected by the threaded rod 41 when the wheels are in the position shown in Figure 1. Although the guides 70 and 71 have been shown as straight throughout their length, it is within the purview of the present invention to have guides which curve regularly or irregularly.

A carriage is received in each guide, as best illustrated in Figure 7, consisting of a top block 76 received in the top rail 73, a bottom block 77 received in the bottom rail 74, and a curved plate 78 interconnecting the two blocks and maintaining their spaced relationship. A half nut 79 is carried by the carriage in a pivotal relationship. The half nut 79 is provided with pins 80 and 81 which are received in recesses 82 and 83 formed in blocks 76 and 77, respectively. The half nut 79 is spaced from the curved plate 78 so as to be freely pivotal in the carriage.

In order that the half nut 79 will not get completely reversed, a pin or other means can be employed to limit the swing of the half nut 79, so that it is generally facing toward the threaded rod 41. There is connected to the arcuate plate 78 a resilient element 85, the connection being best shown in Figure 7 and there indicated by the numeral 84. This resilient element 85 passes from the curved plate 78 back along the guide and around a small pulley wheel 87 which is freely rotatably supported by the inner leg of the fork 42. The end of element 85 is secured adjacent the top of the inner leg of fork 42 to a pin 88. An arrangement as described is provided for the half nut and carriage assembly of each of the two guides. This is perhaps best illustrated in Figures 1 and 2. For purposes of simplicity, the same reference numbers have been designated for the same parts.

To the tie rod 52 is connected one end of a spring 90. The connection is effected by means of a pin 91 which is fixed to the tie rod 52. Since the tie rod passes beneath the platform 20, this structure lies adjacent the underneath surface of the platform. The opposite end of the spring 90 is attached to a pin 92 fixed in the end of a toggle link 93. The opposite end of the toggle link is pivotally connected to the platform 20 by means of a pin 94. Limit stops 95 and 96 are attached to the under surface of the platform 20 to confine the travel of the toggle 93. The toggle 93 assumes one of the two positions shown in Figure 3. The left position is shown in solid line and the right position is shown in phantom.

The apparatus is further provided with a means for terminating the operation of the lawn mower in the event an obstacle is struck head on. A pair of links, 100 and 101, are fixed to the platform 20 as best shown in Figure 3. A second pair of links 102 and 103 are pivotally connected to the first pair. A pair of rods 104 and 105 are connected by pins 106 and 107 to the pivotal links 102 and 103. The rods 104 and 105 pass through collars 108 and 109 in a slidable relationship and springs 110 and 111 are mounted on the rods 104 and 105 to normally bias the pivotal links 102 and 103 outwardly. Grounded contacts 112 and 113 are electrically joined with the rods 104 and 105. The electrical power for the lawn mower, whether it be for a motor or for the spark plug, is electrically connected to contacts 114 and 115 by wires 116 and 117. Whenever the apparatus strikes an obstacle head on, one or the other of the pivotal links 102 and 103 will be pressed toward the platform 20 causing at least one of the rods 104 and 105 to ground at least one of the contacts 114 and 115.

The operation of the apparatus will best be understood by considering the several figures, particularly in conjunction with the showing of Figure 5. There is portrayed in Figure 5 the apparatus in a starting condition. As will be noted, the force of the spring 90 on the tie rod 52 has caused the wheels 22 and 23 to assume a position of approximately 45° with respect to the axis joining the centers of the two wheels. Since the wheel 22 has been caused to assume this angular position, the threaded rod 41 also assumes this same angular position. It will be noted that the guides define an open space through which the threaded rod can pass. At this time, the half nut and carriage assemblies are positioned at the ends of their respective guides which are closest to wheel 22. The threaded rod 41, in its angular position, engages with the half nut 79 carried by the guide 70. Since the half nut 79 can freely pivot, it will be turned by the threaded rod 41 to attack at the proper angle whereby its threads will mesh with threads on the threaded rod 41. This effectively locks the half nut to the threaded rod. It will also be understood that the spring 90 by urging the threaded rod 41, forces it to pivot the half nut 79 to the proper angle of attack.

As a mowing operation is commenced, the wheels 22 and 23 will be caused to turn due to rolling contact with the ground. The turning of the wheel 22 produces a correlated turning of the rod 41. Since there now exists relative motion between the rod 41 and half nut 79, there will be produced a relative axial movement between these two parts. Since the rod 41 is only free to pivot, the relative axial movement will be manifested by the half nut 79. In short, it will attempt to move out along the threaded rod 41. Since it is constrained by the track or guide 70, however, it will necessarily follow the path of the guide and work against the bias of spring 90 to reduce the angular displacement of rod 41. The further the half nut travels, the greater the reduction in angular displacement of the rod 41. Ultimately, if there is no interruption, the half nut will move the entire length of the rod 41 and arrive at the position illustrated in phantom in Figure 5. During this time, the wheels 22 and 23 will be gradually straightened. This condition results from the fact that the angular position of rod 41 determines the angle assumed by the wheel 22. Thus, any angular movement of rod 41 will produce a related angular movement of the wheel 22. The wheel 22, it will be recalled, is connected by means of links and tie rod 52 to the wheel 23 and hence, it also will follow any angular movements of wheel 22. When the half nut 79 has reached the end of the threaded rod 41, the wheels will assume the position illustrated in phantom in Figure 5. It will be noted that the wheels will not be completely straightened but will still lie at a small angle.

Figure 8:
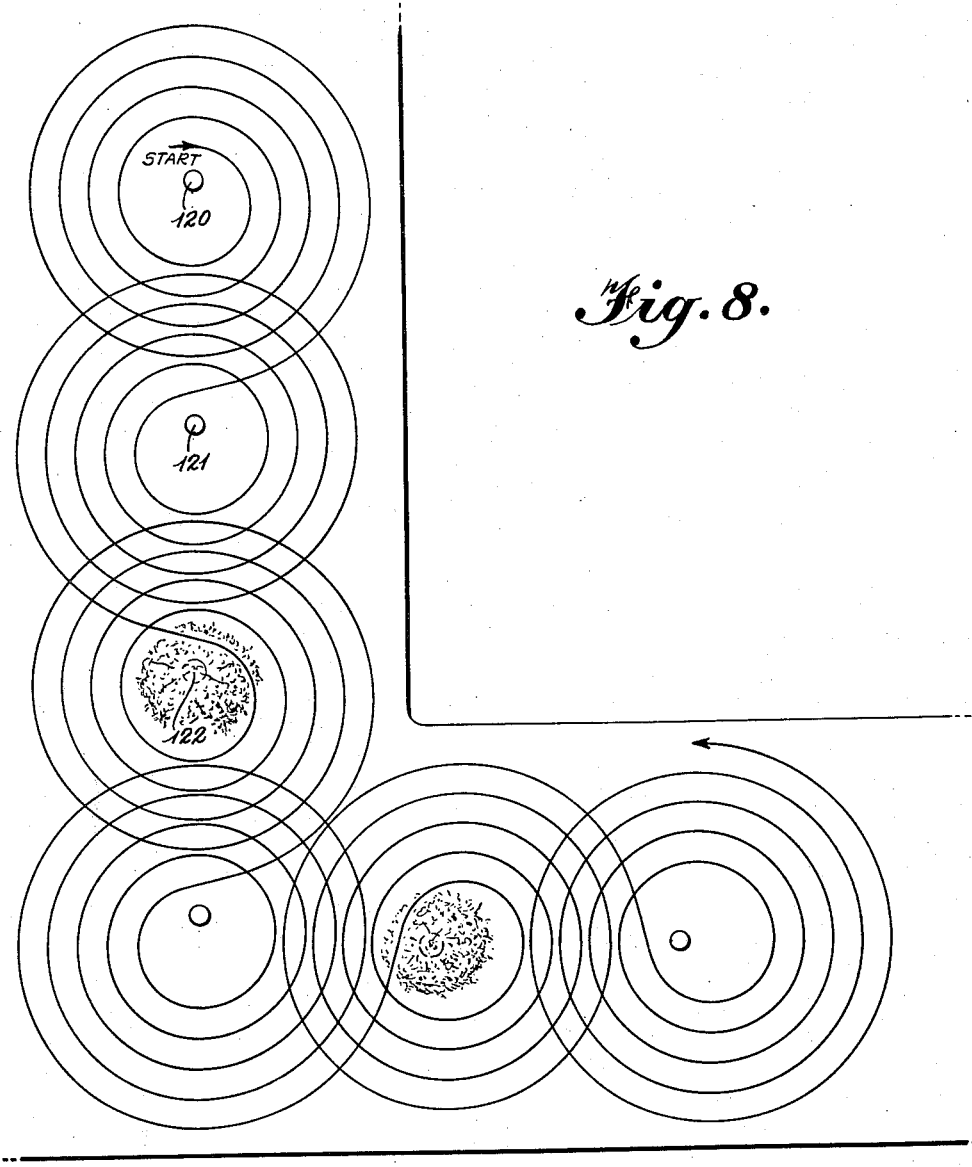
Figure 8 is a schematic representation showing the pattern traced by the mower under the direction of the guidance system.
Figure 9:
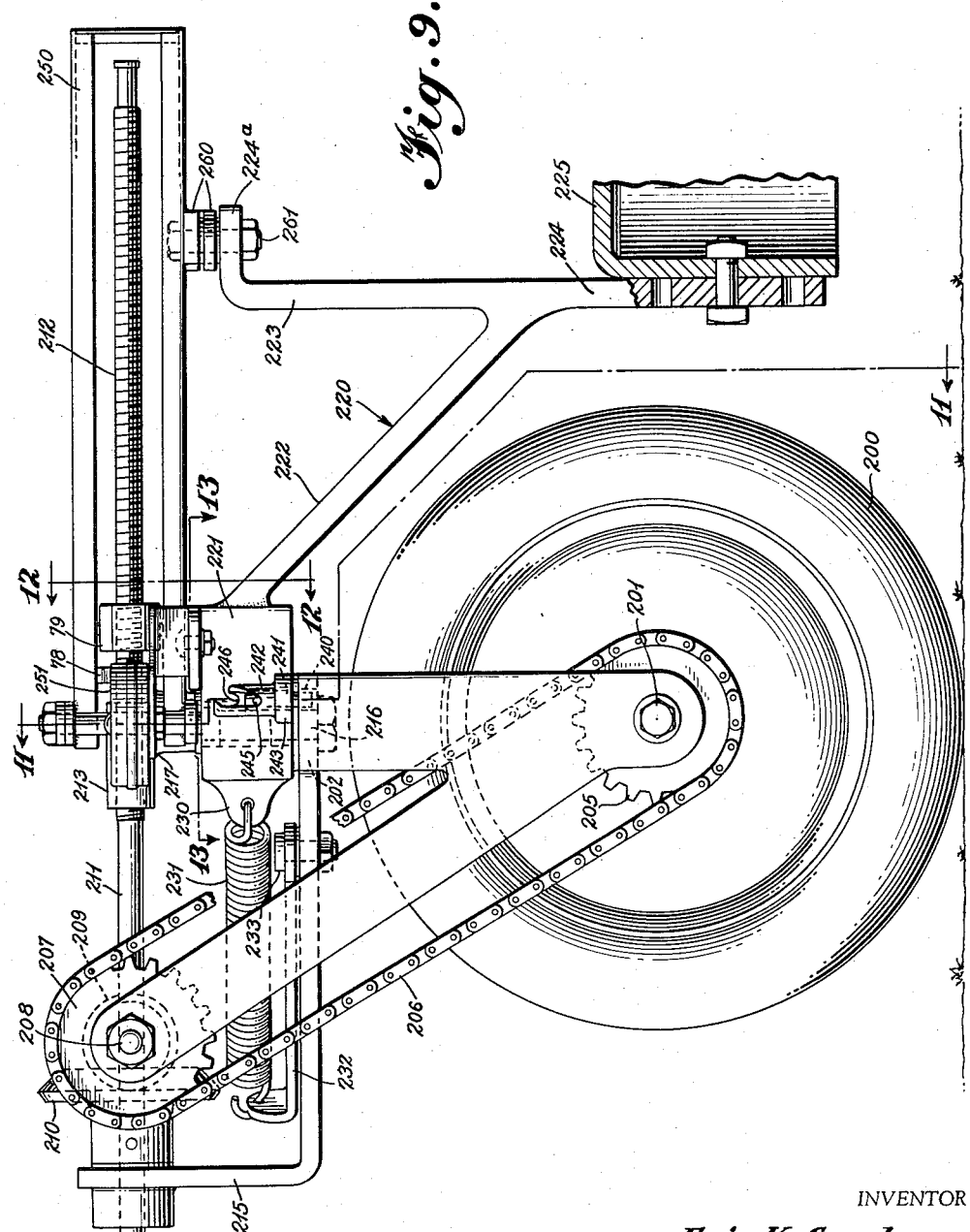
Figure 9 is a view in side elevation of a further embodiment.

The effect of the operation is best illustrated in Figure 8 which portrays schematically the path traced by a lawn mower adapted with the guidance system of the present invention. The starting point is designated in Figure 8 by the word "Start." The starting condition of the apparatus is as illustrated in solid line in Figure 5. The apparatus, since the wheels 22 and 23 are turned at a severe angle, will tend to go in a tight circle. Since, however, rotation of the wheel 22 produces a straightening of the wheels, in the manner previously described, the apparatus will not proceed in a circle but will proceed in an outward spiral until the half nut 79 reaches the end of the threaded rod. At this time, the wheels will have assumed the position shown in phantom in Figure 5 and nothing further will happen, that is, the apparatus will continue to proceed in a large circle.

It is desirable, however, that the apparatus proceed in an outward spiral and then be restored to its initial starting condition and repeat the operation over and over again. This is accomplished by placing stakes or obstacles prescribed distances apart, such that the apparatus will come into contact with the obstacle before the half nut reaches the extreme end of its travel. Accordingly, by referring to Figure 8 is will be seen that the apparatus is caused to start and proceed in an outward spiral from a stake 120. Before the half nut reaches the end of the threaded rod 41, the outside feeler 66 or 67 whichever the case may be, will be caused to come into contact with an obstacle, such as a stake 121. This contact will cause the wheels to flip to their opposite extreme position and will throw the toggle 93 from its existing position to its other position. When this occurs, the threaded rod 41 releases from the half nut 79 of one guide end and is thrown into contact with the half nut 79 of the other guide. The wheels during this action have been pivoted past their center position to the opposite extreme and are now held in this position since the toggle 93 has also been pivoted by spring 90 out of its present position to its other position. The apparatus now commences an outward spiral in the opposite direction and continues until it strikes a further obstacle, designated as a tree 122 in Figure 8. At this time, the outer feeler, the opposite feeler, engages the tree 122 and restores the apparatus to the condition that it occupied at the start. This causes the apparatus to spiral outwardly as it did originally until it strikes a further obstacle which reverses the mechanisms and produces a spiral in the opposite direction. The operation continues in this manner and is characterized by a definite progressive advance.

Whenever the pressure or tension between the threaded rod 41 and the half nut 79 is broken or interrupted, as it will be when one of the feelers of the apparatus strikes an obstacle, the resilient element 85 will pull the half nut and carriage assembly back to its starting position at the end of the guide closest to the wheel 22. The starting position for the half nut and carriage assembly is shown in Figure 5. Accordingly, whenever the apparatus encounters an obstacle, the guidance system composed principally of the wheel 22, threaded rod 41, guides 70 and 71, and half nut and carriage assemblies, will be automatically reset.

In Figures 9–13 inclusive, a further preferred embodiment of the invention is shown. In this case, only a single wheel 200 is used. The wheel is mounted for free rotation upon an axle 201 by means of suitable bearings. A fork composed of depending legs 203 and 204 and an interconnecting web portion 202, is mounted on the axle 201. A sprocket 205 is also mounted on the axle. A chain 206 engages with the sprocket 205 and a sprocket 207 mounted on a stub shaft 208. A bevel gear 209 also mounted on the shaft 208 engages with a bevel gear 210 mounted on a shaft 211. A threaded rod 212 is coaxially coupled by sleeve 213 to shaft 211. The free end of shaft 211 is retained by an L-shaped bracket 215 which is connected with the web portion 202 of the fork. A vertical shaft 216 consisting of a bolt is rigidly fastened to web 202 and extends upwardly. Fixed to the top of bolt 216 is a member 217 through which passes the threaded rod 212. Web 202, bolt 216 and member 217 are all fixed together and all move together. A mounting bracket, generally designated by the numeral 220, is connected to rod 216. The connection is made by a collar 221 pivotally received on the rod 216. The remainder of the bracket consists of two legs 222 and 223 which are joined to a mounting portion 224 for connecting the attachment to the rear of a lawn mower, generally designated by the number 225. The upper end of the leg 223 is provided with a flattened portion 224a, the function of which will become apparent hereinafter. The collar 221 is provided with an ear 230 which holds one end of a spring 231. The other end of the spring is retained by a toggle link 232 which is pivotally attached to the L-shaped bracket 215 by bolt 233.

The web 202 is provided with a hole 240 for receiving a pin 241 carried in a sleeve 242 attached to flange 243 carried by the collar 221. The sleeve 242 is cut with a pair of notches and the pin 241 has attached to it a second pin 245 which projects at right angles. The position of the pin 241 is determined by placing the pin 245 in one of the notches defined by the sleeve. In the position illustrated in Figure 11, the collar 221 can not pivot relative to the web 202. When, however, the pin 241 is elevated and the pin 245 positioned in the notch 246, best shown in Figure 9, the collar 221 will then be free to pivot relative to the web 202 since the pin 241 will be withdrawn from the hole 240.

Figure 12:
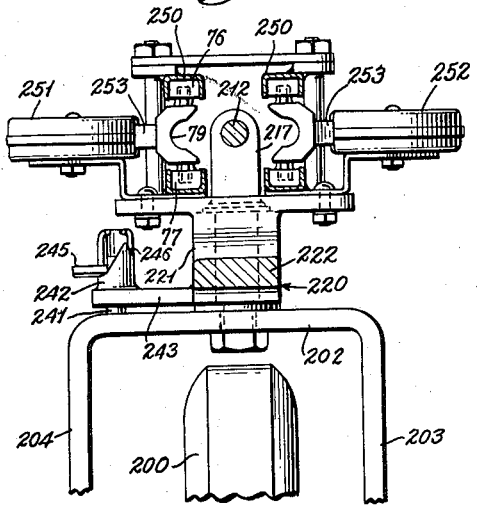
Figure 12 is a view in section taken along line 12—12 of Figure 9.
Figure 13:
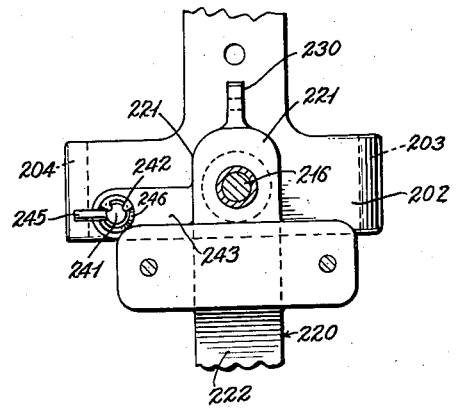
Figure 13 is a view in section taken along line 13—13 of Figure 9.
Figure 14:
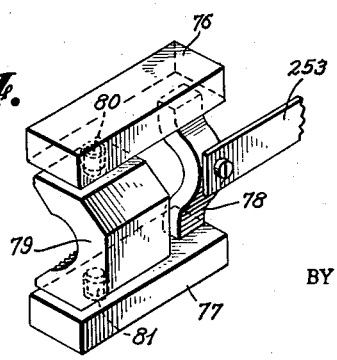
Figure 14 is a prospective view of the half nut and carriage assembly.

A pair of guides or tracks 250 are supported by the collar 221 at one end and the flat portion 224a of leg 223 at their other ends. Since both tracks or guides are identical in construction, a description of one will suffice for an understanding of both. The guides 250 are identical in construction to the guides 70 and 71 illustrated in Figure 1. Slidably contained within each guide is a half nut and carriage assembly similar in all respects with the one illustrated in Figure 7. As mentioned in that connection, one such assembly is provided for each guide. In this embodiment, the reset bias is derived from a pair of reels 251 and 252, each containing a tape 253 spring biased for take-up. The free end of each tape 253 is connected with a half nut. This is best shown in Figures 12 and 14. For purposes of simplicity, the numerals placed on the parts shown on Figure 14 are the same ones as used for Figure 7.

Figure 10:
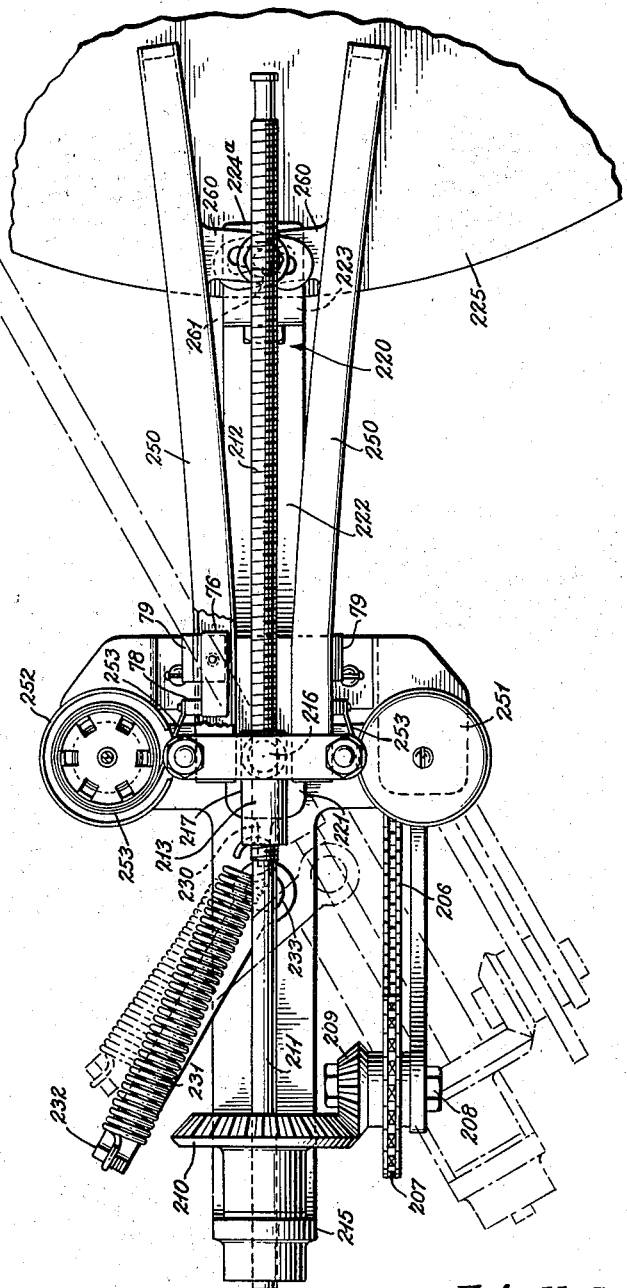
Figure 10 is a view in top plan of the device shown in Figure 9.
Figure 11:
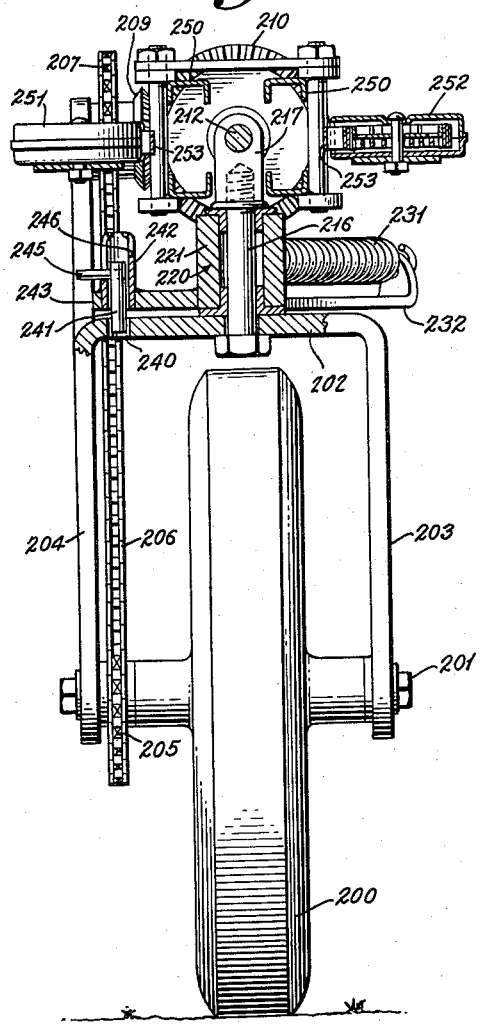
Figure 11 is a view in section taken along line 11—11 of Figure 9.

The guides 250 are each provided with a lug 260 defining an elongated slot whereby they may be mounted to the flat portion 224a of the bracket 220 by means of bolt 261. The operation of the apparatus illustrated in Figures 9 through 13 inclusive is the same as that described for Figures 1–7. The initial starting condition for the apparatus is illustrated in Figure 10 in phantom. As the apparatus rolls in contact with the ground, movement of the wheel is transmitted to the shaft 211 and rod 212 whereby relative axial movement is produced between rod 212 and the half nut assembly in contact with it. The spring 231 maintains the engagement as the nut advances along the track 250. The rod 212 and the wheel are gradually straightened during this action. This action produces the outward spiral previously referred to. The apparatus is provided with feelers, although they are not included in these figures, and the action of the feelers serves to trip the wheel and rod 212 to its opposite position thereby resetting to produce an opposite outward spiral in the manner shown in Figure 8. The tracks 250 are shown slightly curved but they may be straight or regularly or irregularly curved or of any other reasonable configuration. They are made adjustable both pivotally and radially in order that they may be set to impart the most desirable outward spiral to the apparatus.

Figure 15:
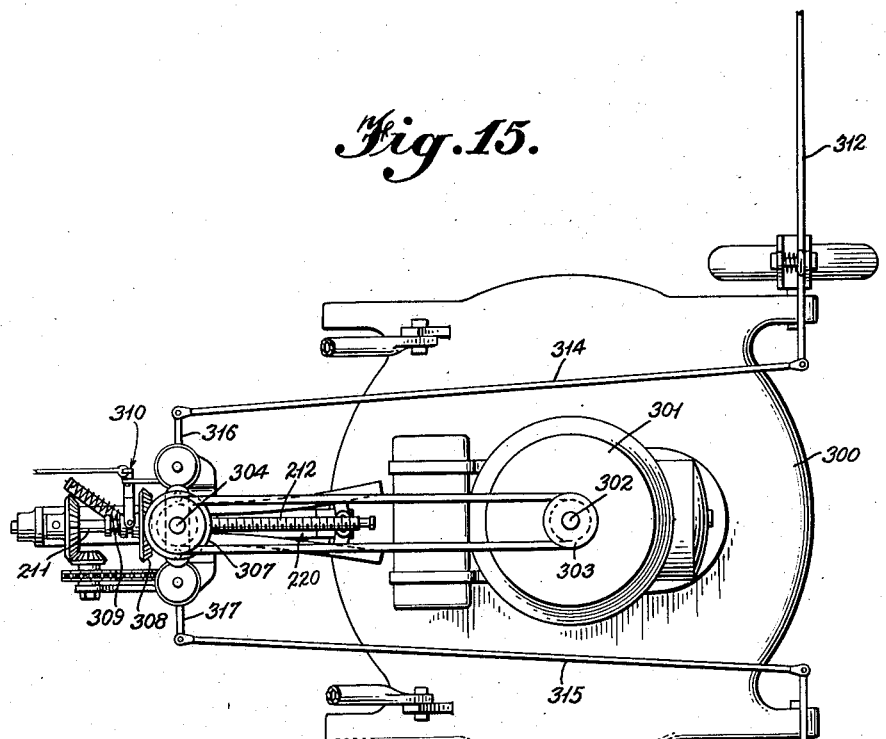
Figure 15 is a top plan view of a self propelled and self guided assembly.
Figure 16:
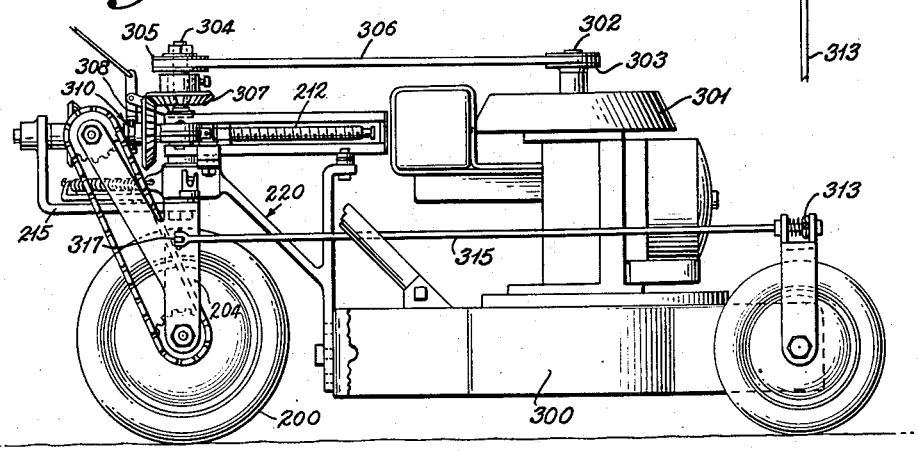
Figure 16 is a side elevational view of the apparatus shown in Figure 15.

Figures 15 and 16 illustrate the apparatus of Figures 9–13 applied to a lawn mower 300. 301 represents a gas engine having a vertical shaft 302 upon which is mounted a pulley 303. A vertical shaft 304 is mounted on the apparatus supported from the bracket 215 or the web portion of the fork. A pulley wheel 305 is mounted on the vertical shaft 304 and a belt 306 transmits the motor power to the shaft 304. A bevel gear 307 is fixed to the shaft 304 and meshes with a bevel gear 308 fixed to the shaft 211. The bevel gear 308 is spring biased, as indicated by numeral 309, into engagement with gear 307. A clutch arrangement, generally indicated by the numeral 310, is provided for coupling and uncoupling the gears 308 and 307. Any conventional clutch mechanism may be used. Feeler arms 312 and 313 are mounted on the forward feelers of the lawn mower in the same fashion as is shown in Figure 1. In this case, however, the feeler arms extend past the wheel and are pivotally connected to tie rods 314 and 315 respectively, which in turn are pivotally connected to links 316 and 317 respectively. The links 316 and 317 are attached to the legs 203 and 204 of the fork. Consequently, if either feeler strikes an obstacle, it will, by means of the linkages described, cause the wheel 200 to pivot. This action was fully described in conjunction with Figures 1–7. Accordingly, the arrangement shown in Figures 15 and 16 includes not only a guidance system, but also an arrangement whereby the power from the mower may be transmitted to the guide wheel 200.

Although the invention has been shown and described in terms of preferred embodiments, nevertheless various changes and modifications, such as are obvious to one skilled in the art are deemed to be in the spirit, scope and contemplation of the invention.

What is claimed is:

1. A guidance system for a vehicle comprising a steerable element, frame means supporting said steerable element, support means pivotally mounting said frame means on a vehicle, track means, means mounting said track means on said support means, threaded means slidably received in said track means, a threaded member carried by said frame means, means connecting said threaded member for rotation responsive to movement of said vehicle and resilient means biasing said steerable element to an angular position and said threaded member into engagement with said threaded means.

2. A guidance system for a vehicle comprising a steerable wheel, frame means supporting said steerable wheel, support means pivotally mounting said frame means on a vehicle, track means, means mounting said track means on said support means, threaded means slidably received in said track means, a threaded member carried by said frame means, means connecting said threaded member for rotation responsive to movement of said vehicle and resilient means biasing said steerable-wheel to an angular position and said threaded member into engagement with said threaded means.

3. A guidance system for a vehicle comprising a steerable wheel, frame means supporting said steerable wheel, support means pivotally mounting said frame means on a vehicle, track means, means mounting said track means on said support means, threaded means slidably received in said track means, a threaded rod carried by said frame means, means mechanically connecting said threaded rod to rotate with said wheel and resilient means biasing said steerable wheel to an angular position and said threaded rod into engagement with said threaded means.

4. A guidance system for a vehicle comprising a steerable element, frame means supporting said steerable element, support means pivotally mounting said frame means on a vehicle, track means, means mounting said track means on said support means, threaded means pivotally and slidably received in said track means, a threaded member carried by said frame means, means connecting said threaded member for rotation responsive to movement of said vehicle and resilient means biasing said steerable element to an angular position and said threaded member into engagement with said threaded means.

5. A guidance system for a vehicle comprising a steerable wheel, frame means supporting said steerable wheel, bracket means pivotally mounting said frame means on a vehicle, track means, means adjustably mounting said track means on said support means, a half nut pivotally and slidably received in said track means, a threaded rod carried by said frame means, means mechanically connecting said threaded rod to rotate with said wheel and resilient means biasing said steerable wheel to an angular position and said threaded member into engagement with said threaded means.

6. A guidance system for a vehicle comprising a pair of wheels, frame means supporting each of said wheels, support means pivotally mounting said frame means on a vehicle, a tie rod interconnecting said wheels for movement in common, track means, means mounting said track means on said support means, threaded means slidably received in said track means, a threaded member carried by said frame means, means connecting said threaded member for rotation responsive to movement of said vehicle and a spring biasing said wheels to an angular position and said threaded member into engagement with said threaded means.

7. A guidance system for a vehicle comprising a steerable element, frame means supporting said steerable element, a shaft mounted on said frame means, support means pivotally mounting said frame means on a vehicle, said shaft passing through said support means and being journalled therein for rotation relative to said support means, a threaded rod rotatably received in said shaft and axially immovable relative to said shaft, the axis of rotation of said threaded rod being disposed in angular relation relative to the rotational axis of said shaft, a pair of elongated track means mounted on said support means and extending adjacent said shaft divergingly outward on opposite sides of said threaded rod, a threaded means slidably received in each track means and being resiliently biased in a direction towards said shaft, means resiliently biasing said threaded rod alternately into engagement with each of said threaded means, and means for rotating said threaded rod in response to the movement of said vehicle.

8. A guidance system for a vehicle comprising a steerable wheel, frame means supporting said steerable wheel, a shaft mounted on said frame means, support means pivotally mounting said frame means on a vehicle, said shaft passing through said support means and being journalled therein for rotation relative to said support means, a threaded rotatably received in said shaft and axially immovable relative to said shaft, the axis of rotation of of said threaded rod being disposed in angular relation relative to the rotational axis of said shaft, a pair of elongated track means mounted on said support means and extending adjacent said shaft divergingly outward on opposite sides of said threaded rod, a threaded means slidably received in each track means and being resiliently biased in a direction towards said shaft, means resiliently biasing said threaded rod alternately into engagement with each of said threaded means, and means for rotating said threaded rod in response to the movement of said vehicle whereby the threaded means in engagement with said rod will advance outwardly in its respective track means away from said shaft so as to turn said wheel gradually as said vehicle moves.

9. A guidance system for a vehicle comprising a steerable element, frame means supporting said steerable element, support means pivotally mounting said frame means on a vehicle, a first projecting means attached to one side of said frame means and responsive to the movement of said vehicle past a first obstruction on one side of said vehicle for turning said steerable element into a first given angular position, a second projecting means attached to the other side of said frame means and responsive to the movement of said vehicle past a second obstruction on the other side of said vehicle for turning said steerable element into a second given angular position, and means mounted on said support means for gradually and continuously turning said steerable element from each given angular position in an angular direction towards the other angular position.

10. A guidance system for a vehicle comprising a steerable wheel, frame means supporting said steerable wheel, support means pivotally mounting said frame means on a vehicle, a first projecting means attached to one side of said frame means and responsive to the movement of said vehicle past a first obstruction on one side of said vehicle for turning said steerable wheel into a first given position, means attached to the other side of said frame means and responsive to the movement of said vehicle past a second obstruction on the other side of said vehicle for turning said steerable wheel into a second angular position, and means mounted on said support means for gradually and continuously turning said steerable wheel from each given angular position in an angular direction towards the other angular position, whereby said vehicle will be steered in an outwardly directed spiral after one of said projecting means strikes an obstruction, the approximate center of said spiral being the locus of the obstruction.

References Cited in the file of this patent

UNITED STATES PATENTS

| 1,570,547 | Avera | Jan. 19, 1926 |
| 2,259,193 | Andrew | Oct 14, 1941 |
| 2,339,291 | Paulus et al. | Jan. 18, 1944 |
| 2,513,868 | Hill | July 4, 1950 |
| 2,742,099 | Hagen | Apr. 17, 1956 |
| 2,751,030 | Null | June 19, 1956 |

FOREIGN PATENTS

| 29,678 | Great Britain | Dec. 24, 1913 |
| 660,841 | Great Britain | Nov. 14, 1951 |

UNITED STATES PATENT OFFICE

CERTIFICATE OF CORRECTION

Patent No. 2,885,019                      May 5, 1959

Eris K. Gardner

It is hereby certified that error appears in the printed specification of the above numbered patent requiring correction and that the said Letters Patent should read as corrected below.

Column 5, line 51, for "is will" read -- it will --; column 9, line 5, after "threaded" insert -- rod --.

Signed and sealed this 25th day of August 1959.

(SEAL)

Attest:
KARL H. AXLINE
Attesting Officer

ROBERT C. WATSON
Commissioner of Patents